US012567267B2

(12) United States Patent
Ohsugi

(10) Patent No.: US 12,567,267 B2
(45) Date of Patent: Mar. 3, 2026

(54) INTERSECTING ROAD DETECTION DEVICE, INTERSECTING ROAD DETECTION METHOD, AND NON-TRANSITORY RECORDING MEDIUM

(71) Applicant: TOYOTA JIDOSHA KABUSHIKI KAISHA, Toyota (JP)

(72) Inventor: Masamichi Ohsugi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/983,912

(22) Filed: Dec. 17, 2024

(65) Prior Publication Data

US 2025/0200993 A1      Jun. 19, 2025

(30) Foreign Application Priority Data

Dec. 19, 2023      (JP) ................................. 2023-213817

(51) Int. Cl.
  *G06T 7/60*      (2017.01)
  *G06V 20/56*      (2022.01)
(52) U.S. Cl.
  CPC .............. *G06V 20/588* (2022.01); *G06T 7/60* (2013.01); *G06T 2207/30256* (2013.01)
(58) Field of Classification Search
  CPC ................... G06V 20/588; G06T 7/60; G06R 2207/30256
  See application file for complete search history.

(56) References Cited

U.S. PATENT DOCUMENTS

| | | | | |
|---|---|---|---|---|
| 6,088,652 A * | 7/2000 | Abe | ..................... | G08G 1/0969 |
| | | | | 701/410 |
| 6,298,296 B1 * | 10/2001 | Takahashi | ........... | B60W 40/064 |
| | | | | 701/79 |
| 10,546,498 B2 * | 1/2020 | Funabashi | .............. | G08G 1/166 |
| 11,867,513 B2 * | 1/2024 | Li | ....................... | G01C 21/3602 |
| 2006/0106518 A1 * | 5/2006 | Stam | .................... | B60Q 1/1423 |
| | | | | 701/49 |
| 2007/0017735 A1 * | 1/2007 | Kataoka | ................. | B62D 6/008 |
| | | | | 180/446 |

(Continued)

FOREIGN PATENT DOCUMENTS

| | | |
|---|---|---|
| JP | H11-003500 A | 1/1999 |
| JP | 2007-271515 A | 10/2007 |

(Continued)

*Primary Examiner* — Brian P Yenke
(74) *Attorney, Agent, or Firm* — Dinsmore & Shohl LLP

(57) ABSTRACT

A intersecting road detection device calculates the width of road pixels at first and second positions in a traveling direction of a host vehicle based on the road pixels corresponding to roads included in a host vehicle front image, calculates the width of the road pixels at a third position in the traveling direction of the host vehicle based on the road pixels, estimates the width of the road pixels at the third position based on the width of the road pixels at the first and second positions by assuming that an intersecting road intersecting a road on which the host vehicle is travelling is not included in the image, and determines that the intersecting road exists at the third position when calculated width of the road pixels at the third position is greater than estimated width of the road pixels at the third position.

5 Claims, 5 Drawing Sheets

(56)　　　　References Cited

U.S. PATENT DOCUMENTS

| | | | | |
|---|---|---|---|---|
| 2008/0123902 A1* | 5/2008 | Park | .................... | G06V 20/588 |
| | | | | 382/104 |
| 2010/0256900 A1* | 10/2010 | Yamaguchi | ......... | G09B 29/007 |
| | | | | 701/533 |
| 2011/0025529 A1* | 2/2011 | Uechi | ............. | G08G 1/096783 |
| | | | | 340/905 |
| 2012/0271483 A1* | 10/2012 | Samukawa | .......... | B60W 30/16 |
| | | | | 701/1 |
| 2013/0016851 A1* | 1/2013 | Asao | ..................... | B60Q 5/008 |
| | | | | 381/86 |
| 2013/0218450 A1* | 8/2013 | Miyamoto | ............ | G01C 21/28 |
| | | | | 701/409 |
| 2013/0266175 A1* | 10/2013 | Zhang | ................. | G06V 10/457 |
| | | | | 382/103 |
| 2014/0267630 A1* | 9/2014 | Zhong | ................. | G06V 20/588 |
| | | | | 348/46 |
| 2016/0314358 A1* | 10/2016 | Kushida | ............... | B60W 30/12 |
| 2017/0018188 A1* | 1/2017 | Ono | ....................... | G05D 1/024 |
| 2017/0116485 A1* | 4/2017 | Mullen | ............. | G08G 1/09626 |
| 2018/0165822 A1* | 6/2018 | Uliyar | ....................... | G06T 7/62 |
| 2018/0182246 A1* | 6/2018 | Baba | ................ | G06F 18/24133 |

| | | | | |
|---|---|---|---|---|
| 2020/0341466 A1* | 10/2020 | Pham | ..................... | G06N 3/045 |
| 2021/0133465 A1* | 5/2021 | Akamine | ................ | G01S 13/93 |
| 2021/0158567 A1* | 5/2021 | Dai | .................... | G01C 21/3658 |
| 2021/0248391 A1* | 8/2021 | Kizumi | ............. | G01C 21/3863 |
| 2021/0343044 A1* | 11/2021 | Lee | ....................... | G06V 20/588 |
| 2022/0063721 A1* | 3/2022 | Kashu | ............... | B62D 15/0255 |
| 2022/0307840 A1* | 9/2022 | Nakatani | ............... | G01C 21/30 |
| 2022/0383644 A1* | 12/2022 | Takano | ................ | G06V 10/753 |
| 2022/0404166 A1* | 12/2022 | Moribe | ............. | G01C 21/3691 |
| 2023/0122011 A1* | 4/2023 | Ishimaru | .................. | G06T 7/73 |
| | | | | 348/148 |
| 2023/0236021 A1* | 7/2023 | Ninomiya | .............. | G01C 21/30 |
| | | | | 701/446 |
| 2023/0260294 A1 | 8/2023 | Tanaka et al. | | |
| 2023/0314164 A1* | 10/2023 | Okuma | ............. | G01C 21/3815 |
| 2024/0175707 A1* | 5/2024 | Okuma | ............. | G01C 21/3822 |
| 2025/0200992 A1* | 6/2025 | Ohsugi | ............... | G06V 20/182 |
| 2025/0216205 A1* | 7/2025 | Baldwin | ........... | G01C 21/3867 |

FOREIGN PATENT DOCUMENTS

| | | |
|---|---|---|
| JP | 2008-139157 A | 6/2008 |
| JP | 2023-118462 A | 8/2023 |

* cited by examiner

FIG. 5

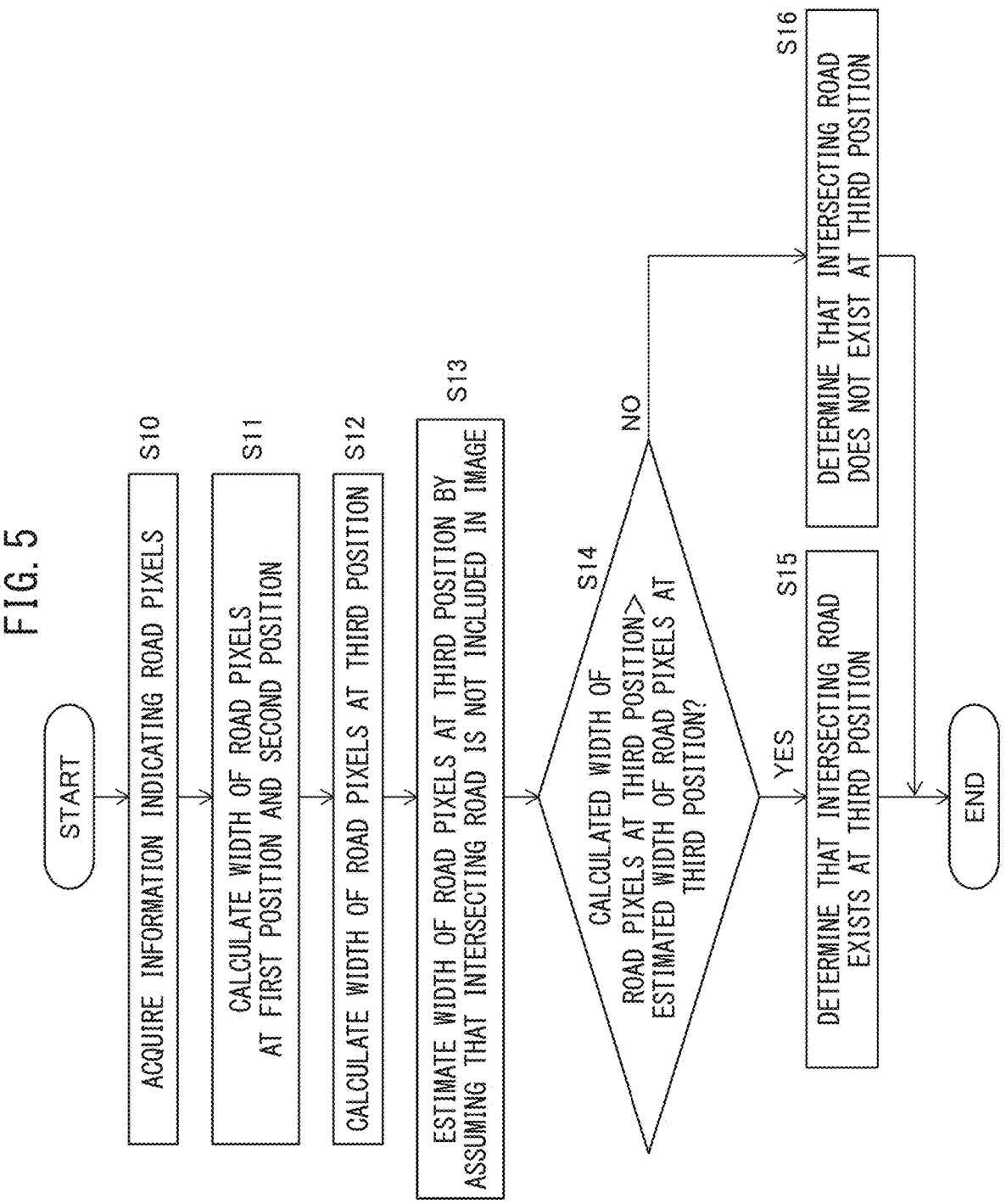

START

ACQUIRE INFORMATION INDICATING ROAD PIXELS — S10

CALCULATE WIDTH OF ROAD PIXELS AT FIRST POSITION AND SECOND POSITION — S11

CALCULATE WIDTH OF ROAD PIXELS AT THIRD POSITION — S12

ESTIMATE WIDTH OF ROAD PIXELS AT THIRD POSITION BY ASSUMING THAT INTERSECTING ROAD IS NOT INCLUDED IN IMAGE — S13

CALCULATED WIDTH OF ROAD PIXELS AT THIRD POSITION> ESTIMATED WIDTH OF ROAD PIXELS AT THIRD POSITION? — S14

NO

DETERMINE THAT INTERSECTING ROAD DOES NOT EXIST AT THIRD POSITION — S16

YES

DETERMINE THAT INTERSECTING ROAD EXISTS AT THIRD POSITION — S15

END

INTERSECTING ROAD DETECTION DEVICE, INTERSECTING ROAD DETECTION METHOD, AND NON-TRANSITORY RECORDING MEDIUM

CROSS-REFERENCE TO RELATED APPLICATIONS

This application claims priority to Japanese Patent Application No. 2023-213817 filed Dec. 19, 2023, the entire contents of which are herein incorporated by reference.

FIELD

The present disclosure relates to intersecting road detection device, intersecting road detection method, and non-transitory recording medium.

BACKGROUND

PTL 1 (JPH113500A) discloses that it is determined whether a shot image includes a lateral road (lateral road extending in the lateral direction with respect to a vehicle, including an oblique direction).

In the technique described in PTL 1, the measurement result of an autofocus device is used in order to determine whether the lateral road is included in the shot image. Therefore, in the technique described in PTL 1, when the information indicating the measurement result of the autofocus device is not included in the data of the shot image, it is impossible to detect the lateral road included in the shot image.

While a host vehicle is travelling, detection of an intersecting road (intersection) is required in order to respond to jumping out of bicycles, pedestrians, etc. in the vicinity of the intersection, or to reduce collision between the host vehicle and a surrounding vehicle travelling on the intersecting road which intersects a road on which the host vehicle is travelling at the intersection. When GPS (Global Positioning System) and map information are used to detect the intersection road (intersection), there is a risk that the cost may become high or the position of the intersection road (intersection) may be detected incorrectly due to misalignment of the GPS. If the intersecting road (intersection) is detected by using a partition line or the like of the road on which the host vehicle is traveling, which is included in the image obtained by shooting the front of the host vehicle, there is a possibility that the intersecting road (intersection) may not be properly detected when a clear partition line is not provided on the road on which the host vehicle is traveling. The intersecting road needs to be properly detected because the intersecting road is an area where something may run into the road on which the host vehicle is travelling.

SUMMARY

In view of the above-described points, it is an object of the present disclosure to provide intersecting road detection device, intersecting road detection method, and non-transitory recording medium that can appropriately detect an intersecting road which intersects a road on which a host vehicle is travelling.

(1) One aspect of the present disclosure is an intersecting road detection device including a processor configured to: acquire information indicating road pixels which are pixels corresponding to roads included in an image obtained by shooting the front of a host vehicle, the road pixels being generated from the image; calculate at least the width of the road pixels at a first position in a traveling direction of the host vehicle and the width of the road pixels at a second position different from the first position in the traveling direction of the host vehicle as the width of a road on which the host vehicle is traveling based on the road pixels; calculate the width of the road pixels at a third position different from the first position and the second position in the traveling direction of the host vehicle based on the road pixels; estimate the width of the road pixels at the third position based on at least the width of the road pixels at the first position and the width of the road pixels at the second position by assuming that an intersecting road which is a road intersecting the road on which the host vehicle is travelling is not included in the image; and determine that the intersecting road exists at the third position when calculated width of the road pixels at the third position is greater than estimated width of the road pixels at the third position.

(2) In the intersecting road detection device of the aspect (1), the processor may be configured to determine that the intersecting road does not exist at the third position when the calculated width of the road pixels at the third position is equal to the estimated width of the road pixels at the third position.

(3) In the intersecting road detection device of the aspect (1) or (2), the third position may be further away from the host vehicle than the first position and the second position.

(4) Another aspect of the present disclosure is an intersecting road detection method including: acquiring information indicating road pixels which are pixels corresponding to roads included in an image obtained by shooting the front of a host vehicle, the road pixels being generated from the image; calculating at least the width of the road pixels at a first position in a traveling direction of the host vehicle and the width of the road pixels at a second position different from the first position in the traveling direction of the host vehicle as the width of a road on which the host vehicle is traveling based on the road pixels; calculating the width of the road pixels at a third position different from the first position and the second position in the traveling direction of the host vehicle based on the road pixels; estimating the width of the road pixels at the third position based on at least the width of the road pixels at the first position and the width of the road pixels at the second position by assuming that an intersecting road which is a road intersecting the road on which the host vehicle is travelling is not included in the image; and determining that the intersecting road exists at the third position when calculated width of the road pixels at the third position is greater than estimated width of the road pixels at the third position.

(5) Another aspect of the present disclosure is a non-transitory recording medium having recorded thereon a computer program for causing a processor to perform a process including: acquiring information indicating road pixels which are pixels corresponding to roads included in an image obtained by shooting the front of a host vehicle, the road pixels being generated from the image; calculating at least the width of the road pixels at a first position in a traveling direction of the host vehicle and the width of the road pixels at a second position different from the first position in the traveling direction of the host vehicle as the width of a road on which the host vehicle is traveling based on the road pixels; calculating the width of the road pixels at a third position different from the first position and the second position in the traveling direction of the host vehicle based on the road pixels; estimating the width of the road pixels at the third position based on at least the width of the road pixels at the first position and the width of the road pixels at the second position by assuming that an intersecting road which is a road intersecting the road on which the host vehicle is travelling is not included in the image; and determining that the intersecting road exists at the third position when calculated width of the road pixels at the third position is greater than estimated width of the road pixels at the third position.

According to the present disclosure, it is possible to appropriately detect the intersecting road which intersects the road on which the host vehicle is travelling.

BRIEF DESCRIPTION OF DRAWINGS

FIG. 2 is a view showing a first example of process result of image segmentation performed by an image process device 3A and the like.

FIG. 3 is a view showing a second example of the process result of the image segmentation performed by the image process device 3A and the like.

FIG. 4 is a view showing a third example of the process result of the image segmentation performed by the image process device 3A and the like.

FIG. 5 is a flowchart for explaining an example of a process performed by a processor 153 of the intersecting road detection device 15 of the first embodiment.

DESCRIPTION OF EMBODIMENTS

Figure 1:
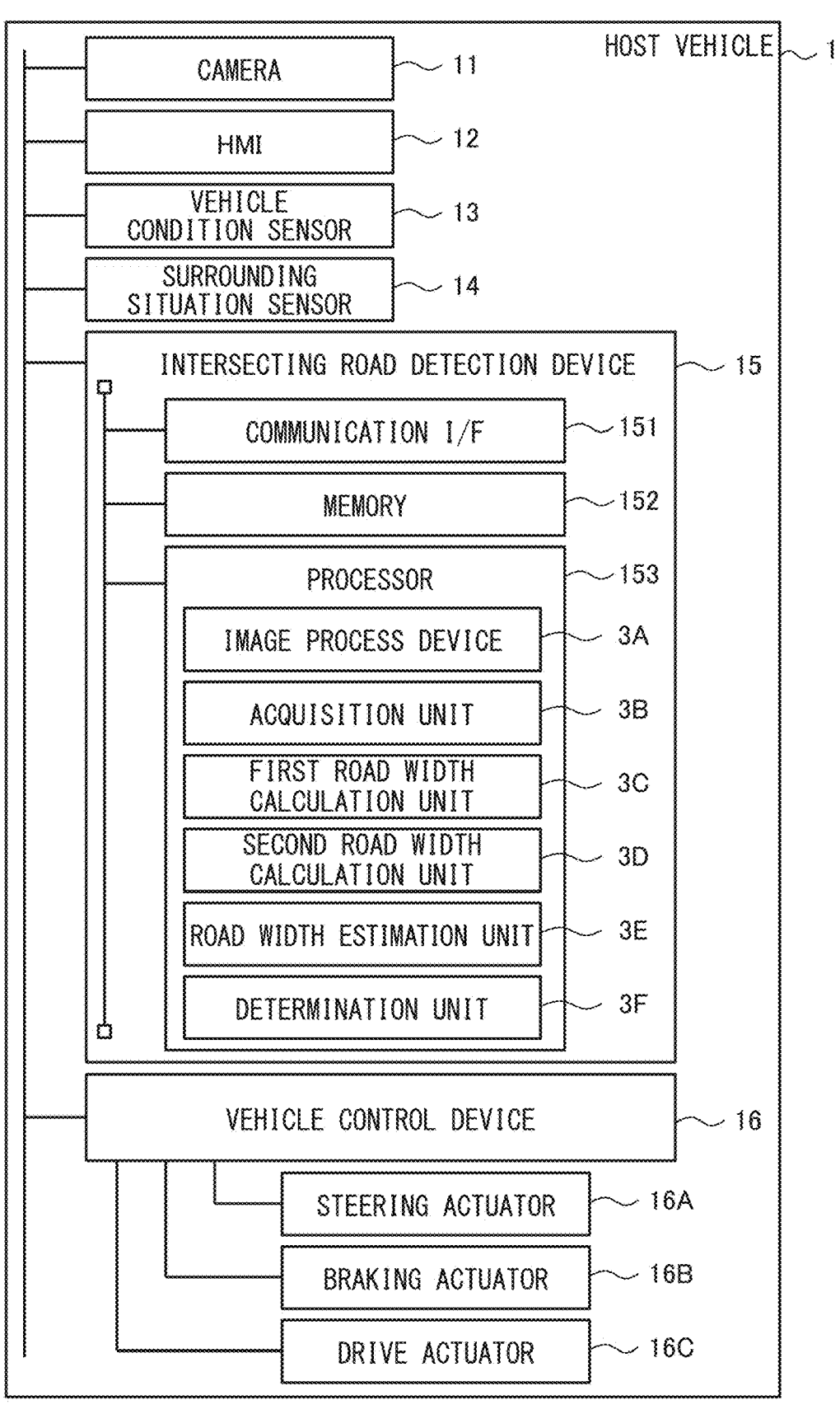
FIG. 1 is a view showing an example of a host vehicle 1 to which an intersecting road detection device 15 of a first embodiment is applied.

Below, referring to the drawings, embodiments of intersecting road detection device, intersecting road detection method, and non-transitory recording medium of the present disclosure will be explained.

First Embodiment

FIG. 1 is a view showing an example of a host vehicle 1 to which an intersecting road detection device 15 of a first embodiment is applied. In the example shown in FIG. 1, the host vehicle 1 includes camera 11, HMI (Human Machine Interface) 12, vehicle condition sensor 13, surrounding situation sensor 14, intersecting road detection device 15, vehicle control device 16, steering actuator 16A, braking actuator 16B, and drive actuator 16C. The camera 11 shoots the front of the host vehicle 1 and transmits data of a host vehicle front image to the intersecting road detection device 15 and the vehicle control device 16. The HMI 12 has the function of receiving various operations of a driver of the host vehicle 1 and the like and transmits signals indicating the operations of the driver of the host vehicle 1 to the vehicle control device 16. The vehicle condition sensor 13 detects condition of the host vehicle 1 and transmits the detection result to the vehicle control device 16. The vehicle condition sensor 13 includes, for example, vehicle speed sensor and the like. The surrounding situation sensor 14 detects, for example, obstacle, surrounding vehicle, pedestrian and the like existing in the vicinity of the host vehicle 1 and transmits the detection result to the vehicle control device 16. The surrounding situation sensor 14 includes, for example, camera for shooting the side, the rear, and the like of the host vehicle 1, LiDAR (Light Detection And Ranging), radar, sonar or the like. The intersecting road detection device 15 detects roads (intersecting roads RD3, RD5 (refer to FIG. 3 and FIG. 4)) which intersect a road on which the host vehicle 1 is travelling (host vehicle travelling road RD1, RD2, RD4 (see FIG. 2 to FIG. 4)) and transmits the detection result to the vehicle control device 16. The vehicle control device 16 is configured by a driving assistance ECU (Electronic Control Unit). The vehicle control device 16 controls the steering actuator 16A, the braking actuator 16B, and the drive actuator 16C based on, for example, information (data, signals) transmitted from the camera 11, the HMI 12, the vehicle condition sensor 13, the surrounding situation sensor 14 and the intersecting road detection device 15.

The intersecting road detection device 15 is configured by a microcomputer which includes communication interface (I/F) 151, memory 152 and processor 153. The communication interface 151 includes an interface circuit for connecting the intersecting road detection device 15 to the camera 11 and the vehicle control device 16. The memory 152 stores program used in a process performed by the processor 153 and various data. The processor 153 has the function as an image process device 3A, the function as an acquisition unit 3B, the function as a first road width calculation unit 3C, the function as a second road width calculation unit 3D, the function as a road width estimation unit 3E and the function as a determination unit 3F. The image process device 3A acquires the data of the host vehicle front image transmitted from the camera 11. In addition, the image process device 3A executes a process of image segmentation (identification of a subject included in the image) such as, for example, semantic segmentation or the like for the host vehicle front image.

Figure 2:
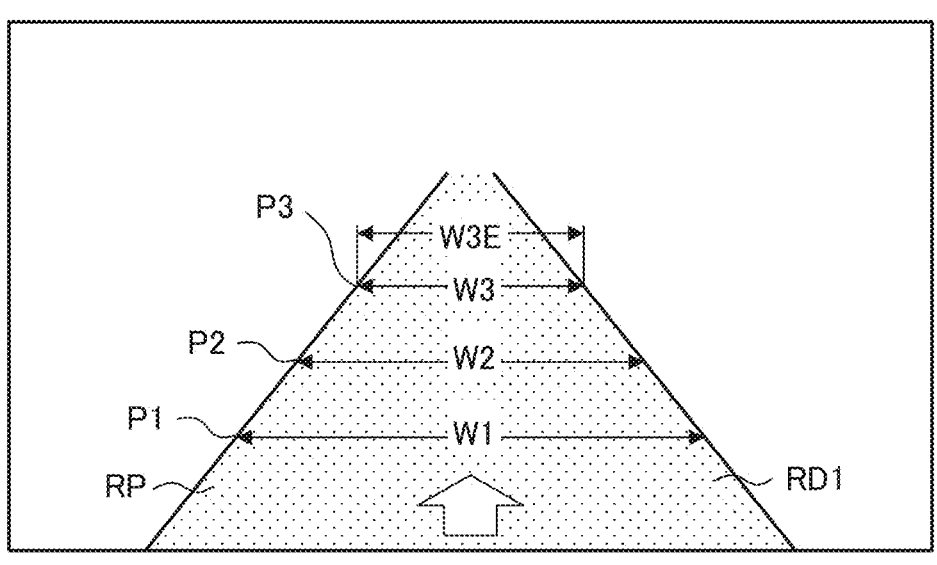
Figure 3:
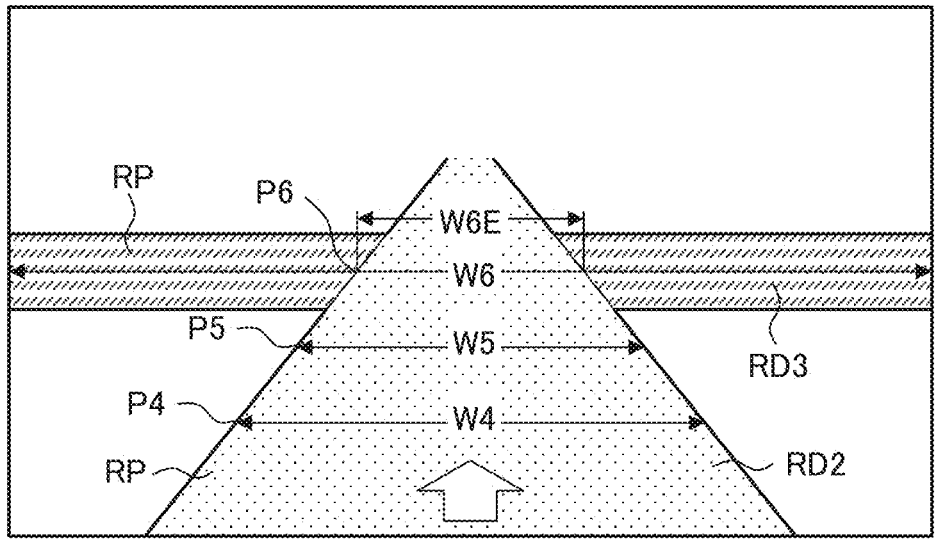
Figure 4:
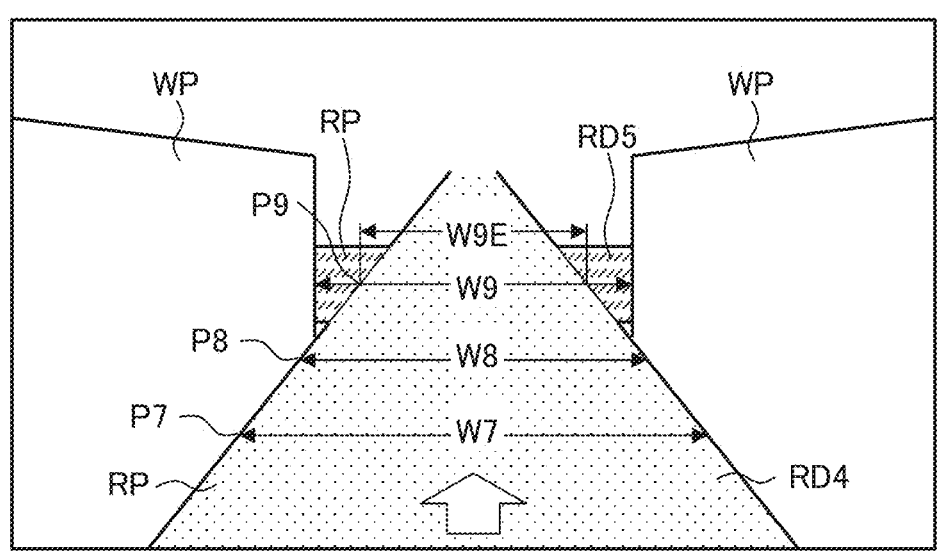

FIG. 2 to FIG. 4 are views showing examples of process result of the image segmentation performed by the image process device 3A. Specifically, FIG. 2 shows a first example of the process result of the image segmentation performed by the image process device 3A and the like. FIG. 3 shows a second example of the process result of the image segmentation performed by the image process device 3A and the like. FIG. 4 shows a third example of the process result of the image segmentation performed by the image process device 3A and the like. In the example shown in FIG. 2, the process result of the image segmentation executed by the image process device 3A for the host vehicle front image shot by the camera 11 includes road pixels RP corresponding to a road on which the host vehicle 1 is travelling (host vehicle travelling road RD1). In the example shown in FIG. 3, the process result of the image segmentation executed by the image process device 3A for the host vehicle front image shot by the camera 11 includes the road pixels RP corresponding to a road on which the host vehicle 1 is travelling (host vehicle travelling road RD2) and a road (intersecting road RD3) intersecting the host vehicle travelling road RD2. In the example shown in FIG. 4, the process result of the image segmentation executed by the image process device 3A for the host vehicle front image shot by the camera 11 includes the road pixels RP corresponding to a road on which the host vehicle 1 is travelling (host vehicle travelling road RD4) and a road (intersecting road RD5) intersecting the host vehicle travelling road RD4, and the wall pixels WP corresponding to walls provided adjacently to the host vehicle travelling road RD4.

In the example shown in FIG. 1, the acquisition unit 3B acquires information indicating the road pixels RP from the process result of the image segmentation executed by the image process device 3A. That is, the acquisition unit 3B acquires the information indicating pixels corresponding to the roads RD1, RD2, RD3, RD4, RD5 (road pixels RP) included in the host vehicle front image, which are generated from the image (the host vehicle front image) obtained by shooting the front of the host vehicle 1. Specifically, in the example shown in FIG. 2, the acquisition unit 3B acquires the information indicating the road pixels RP corresponding to the host vehicle travelling road RD1. In the example shown in FIG. 3, the acquisition unit 3B acquires the information indicating the road pixels RP corresponding to the host vehicle travelling road RD2 and the intersecting road RD3. In the example shown in FIG. 4, the acquisition unit 3B acquires the information indicating the road pixels RP corresponding to the host vehicle travelling road RD4 and the intersecting road RD5. In the example shown in FIG. 1, the acquisition unit 3B also acquires information indicating the wall pixels WP (see FIG. 4) from the process result of the image segmentation executed by the image process device 3A.

In the example shown in FIG. 1, the first road width calculation unit 3C calculates the width W1, W4, W7 of the road pixels RP at a first position P1, P4, P7 in a traveling direction of the host vehicle 1 as the width of the host vehicle travelling road RD1, RD2, RD4 based on the road pixels RP indicated by the information acquired by the acquisition unit 3B. Further, the first road width calculation unit 3C calculates the width W2, W5, W8 of the road pixels RP at a second position P2, P5, P8 in the traveling direction of the host vehicle 1 as the width of the host vehicle travelling road RD1, RD2, RD4 based on the road pixels RP indicated by the information acquired by the acquisition unit 3B. Specifically, in the example shown in FIG. 2, the first road width calculation unit 3C calculates the width W1 of the road pixels RP at the first position P1 in the traveling direction of the host vehicle 1 shown by a white arrow in FIG. 2 as the width of the host vehicle travelling road RD1 based on the road pixels RP indicated by the information acquired by the acquisition unit 3B. Further, the first road width calculation unit 3C calculates the width W2 of the road pixels RP at the second position P2 different from the first position P1 in the traveling direction of the host vehicle 1 as the width of the host vehicle travelling road RD1 based on the road pixels RP indicated by the information acquired by the acquisition unit 3B. In the example shown in FIG. 3, the first road width calculation unit 3C calculates the width W4 of the road pixels RP at the first position P4 in the traveling direction of the host vehicle 1 shown by the white arrow in FIG. 3 as the width of the host vehicle travelling road RD2 based on the road pixels RP indicated by the information acquired by the acquisition unit 3B. Further, the first road width calculation unit 3C calculates the width W5 of the road pixels RP at the second position P5 different from the first position P4 in the traveling direction of the host vehicle 1 as the width of the host vehicle travelling road RD2 based on the road pixels RP indicated by the information acquired by the acquisition unit 3B. In the example shown in FIG. 4, the first road width calculation unit 3C calculates the width W7 of the road pixels RP at the first position P7 in the traveling direction of the host vehicle 1 shown by the white arrow in FIG. 4 as the width of the host vehicle travelling road RD4 based on the road pixels RP indicated by the information acquired by the acquisition unit 3B. Further, the first road width calculation unit 3C calculates the width W8 of the road pixels RP at the second position P8 different from the first position P7 in the traveling direction of the host vehicle 1 as the width of the host vehicle travelling road RD4 based on the road pixels RP indicated by the information acquired by the acquisition unit 3B.

In the example shown in FIG. 1, the second road width calculation unit 3D calculates the width W3, W6, W9 of the road pixels RP at a third position P3, P6, P9 different from the first position P1, P4, P7 and the second position P2, P5, P8 in the traveling direction of the host vehicle 1 based on the road pixels RP indicated by the information acquired by the acquisition unit 3B. Specifically, in the example shown in FIG. 2, the second road width calculation unit 3D calculates the width W3 of the road pixels RP at the third position P3 different from the first position P1 and the second position P2 in the traveling direction of the host vehicle 1 shown by the white arrow in FIG. 2 based on the road pixels RP indicated by the information acquired by the acquisition unit 3B. In the example shown in FIG. 3, the second road width calculation unit 3D calculates the width W6 of the road pixels RP at the third position P6 different from the first position P4 and the second position P5 in the traveling direction of the host vehicle 1 shown by the white arrow in FIG. 3 based on the road pixels RP indicated by the information acquired by the acquisition unit 3B. In the example shown in FIG. 4, the second road width calculation unit 3D calculates the width W9 of the road pixels RP at the third position P9 different from the first position P7 and the second position P8 in the traveling direction of the host vehicle 1 shown by the white arrow in FIG. 4 based on the road pixels RP indicated by the information acquired by the acquisition unit 3B. In the examples shown in FIG. 2 to FIG. 4, the third position P3, P6, P9 is further away from the host vehicle 1 than the first position P1, P4, P7 and the second position P2, P5, P8 (set on the upper side of FIG. 2 to FIG. 4). Therefore, in the examples shown in FIG. 2 to FIG. 4, it is possible to improve the estimation accuracy of the width W3E, W6E, W9E of the road pixels RP at the third position P3, P6, P9 by the road width estimation unit 3E than when the third position P3, P6, P9 is set closer to the host vehicle 1 than the first position P1, P4, P7 and the second position P2, P5, P8.

In the example shown in FIG. 1, the road width estimation unit 3E estimates the width W3E, W6E, W9E of the road pixels RP at the third position P3, P6, P9 based on the width W1, W4, W7 of the road pixels RP at the first position P1, P4, P7 and the width W2, W5, W8 of the road pixels RP at the second position P2, P5, P8 calculated by the first road width calculation unit 3C by assuming that the road (intersecting road RD3, RD5) which intersects the host vehicle travelling road RD1, RD2, RD4 is not included in the host vehicle front image shot by the camera 11. Concretely, in the example shown in FIG. 2, the road width estimation unit 3E estimates the width W3E of the road pixels RP at the third position P3 based on the width W1 of the road pixels RP at the first position P1 and the width W2 of the road pixels RP at the second position P2 calculated by the first road width calculation unit 3C by assuming that the road which intersects the host vehicle travelling road RD1 is not included in the host vehicle front image shot by the camera 11. Specifically, in the example shown in FIG. 2, the road width estimation unit 3E estimates the coordinate of the left end of the road pixels RP at the third position P3 by extending a line segment connecting the left end of the road pixels RP at the first position P1 and the left end of the road pixels RP at the second position P2 to the third position P3. The road width estimation unit 3E estimates the coordinate of the right end of the road pixels RP at the third position P3 by extending the line segment connecting the right end of the road pixels RP at the first position P1 and the right end of the road pixels RP at the second position P2 to the third position P3. Furthermore, the road width estimation unit 3E calculates the distance between the estimated coordinate of the left end of the road pixels RP at the third position P3 and the estimated coordinate of the right end of the road pixels RP at the third position P3 as the width W3E of the road pixels RP at the third position P3. In the example shown in FIG. 3, the road width estimation unit 3E estimates the width W6E of the road pixels RP at the third position P6 based on the width W4 of the road pixels RP at the first position P4 and the width W5 of the road pixels RP at the second position P5 calculated by the first road width calculation unit 3C by assuming that the road (intersecting road RD3) which intersects the host vehicle travelling road RD2 is not included in the host vehicle front image shot by the camera 11. Specifically, in the example shown in FIG. 3, the road width estimation unit 3E estimates the coordinate of the left end of the road pixels RP at the third position P6 by extending the line segment connecting the left end of the road pixels RP at the first position P4 and the left end of the road pixels RP at the second position P5 to the third position P6. The road width estimation unit 3E estimates the coordinate of the right end of the road pixels RP at the third position P6 by extending the line segment connecting the right end of the road pixels RP at the first position P4 and the right end of the road pixels RP at the second position P5 to the third position P6. Furthermore, the road width estimation unit 3E calculates the distance between the estimated coordinate of the left end of the road pixels RP at the third position P6 and the estimated coordinate of the right end of the road pixels RP at the third position P6 as the width W6E of the road pixels RP at the third position P6.

In the example shown in FIG. 4, the road width estimation unit 3E estimates the width W9E of the road pixels RP at the third position P9 based on the width W7 of the road pixels RP at the first position P7 and the width W8 of the road pixels RP at the second position P8 calculated by the first road width calculation unit 3C by assuming that the road (intersecting road RD5) which intersects the host vehicle travelling road RD4 is not included in the host vehicle front image shot by the camera 11. Specifically, in the example shown in FIG. 4, the road width estimation unit 3E estimates the coordinate of the left end of the road pixels RP at the third position P9 by extending the line segment connecting the left end of the road pixels RP at the first position P7 and the left end of the road pixels RP at the second position P8 to the third position P9. The road width estimation unit 3E estimates the coordinate of the right end of the road pixels RP at the third position P9 by extending the line segment connecting the right end of the road pixels RP at the first position P7 and the right end of the road pixels RP at the second position P8 to the third position P9. Furthermore, the road width estimation unit 3E calculates the distance between the estimated coordinate of the left end of the road pixels RP at the third position P9 and the estimated coordinate of the right end of the road pixels RP at the third position P9 as the width W9E of the road pixels RP at the third position P9. As described above, in the example shown in FIG. 1, the first road width calculation unit 3C calculates the width W1, W4, W7 of the road pixels RP at the first position P1, P4, P7 in the traveling direction of the host vehicle 1 and the width W2, W5, W8 of the road pixels RP at the second position P2, P5, P8 in the traveling direction of the host vehicle 1 as the width of the host vehicle travelling road RD1, RD2, RD4 (that is, calculates the width of the road pixels RP at two positions in the traveling direction of the host vehicle 1). Furthermore, the road width estimation unit 3E estimates the width W3E, W6E, W9E of the road pixels RP at the third position P3, P6, P9 based on the width of the road pixels RP at the two positions in the traveling direction of the host vehicle 1 calculated by the first road width calculation unit 3C. In another example, the first road width calculation unit 3C may calculate the width of the road pixels RP at three or more positions in the traveling direction of the host vehicle 1 as the width of the host vehicle travelling road, and the road width estimation unit 3E may estimate the width of the road pixels RP at a position different from the three or more positions in the traveling direction of the host vehicle 1 based on the width of the road pixels RP at the three or more positions in the traveling direction of the host vehicle 1 calculated by the first road width calculation unit 3C.

In the example shown in FIG. 1, the determination unit 3F determines that the intersecting road RD3, RD5 exists at the third position P6, P9 when the width W6, W9 of the road pixels RP at the third position P6, P9 calculated by the second road width calculation unit 3D is greater than the width W6E, W9E of the road pixels RP at the third position P6, P9 estimated by the road width estimation unit 3E. In addition, the determination unit 3F determines that the intersecting road does not exist at the third position P3 when the width W3 of the road pixels RP at the third position P3 calculated by the second road width calculation unit 3D is equal to the width W3E of the road pixels RP at the third position P3 estimated by the road width estimation unit 3E. Specifically, in the example shown in FIG. 2, since the width W3 of the road pixels RP at the third position P3 calculated by the second road width calculation unit 3D is equal to the width W3E of the road pixels RP at the third position P3 estimated by the road width estimation unit 3E, the determination unit 3F determines that the intersecting road does not exist at the third position P3. In the example shown in FIG. 3, since the width W6 of the road pixels RP at the third position P6 calculated by the second road width calculation unit 3D is greater than the width W6E of the road pixels RP at the third position P6 estimated by the road width estimation unit 3E, the determination unit 3F determines that the intersecting road RD3 exists at the third position P6. In the example shown in FIG. 4, since the width W9 of the road pixels RP at the third position P9 calculated by the second road width calculation unit 3D is greater than the width W9E of the road pixels RP at the third position P9 estimated by the road width estimation unit 3E, the determination unit 3F determines that the intersecting road RD5 exists at the third position P9.

In the example shown in FIG. 1, when the determination unit 3F determines that the intersecting road RD3, RD5 exists in front of the traveling direction of the host vehicle 1 (at the third position P6, P9), the vehicle control device 16 (driving assistance ECU) causes the HMI 12 to output an alarm indicating that the intersecting road RD3, RD5 exists in front of the traveling direction of the host vehicle 1, for example, by displaying, audio, or the like, based on the detection result of the intersecting road detection device 15 (determination result of the determination unit 3F). In another example, when the determination unit 3F determines that the intersecting road RD3, RD5 exists in front of the traveling direction of the host vehicle 1 (at the third position P6, P9), the vehicle control device 16 (driving assistance ECU) may execute braking assistance and/or steering assistance for avoiding a collision between the host vehicle 1 and another vehicle, a pedestrian, or the like which jumps out from the intersecting road RD3, RD5 to the host vehicle traveling road RD2, RD4.

FIG. 5 is a flowchart for explaining an example of the process performed by the processor 153 of the intersecting road detection device 15 of the first embodiment. In the example shown in FIG. 5, at step S10, the acquisition unit 3B acquires the information indicating the road pixels RP. At step S11, the first road width calculation unit 3C calculates the width W1, W4, W7 of the road pixels RP at the first position P1, P4, P7 in the traveling direction of the host vehicle 1 and the width W2, W5, W8 of the road pixels RP at a second position P2, P5, P8 in the traveling direction of the host vehicle 1 as the width of the host vehicle travelling road RD1, RD2, RD4 based on the road pixels RP indicated by the information acquired at step S10. At step S12, the second road width calculation unit 3D calculates the width W3, W6, W9 of the road pixels RP at the third position P3, P6, P9 different from the first position P1, P4, P7 and the second position P2, P5, P8 in the traveling direction of the host vehicle 1 based on the road pixels RP indicated by the information acquired at step S10. At step S13, the road width estimation unit 3E estimates the width W3E, W6E, W9E of the road pixels RP at the third position P3, P6, P9 based on the width W1, W4, W7 of the road pixels RP at the first position P1, P4, P7 and the width W2, W5, W8 of the road pixels RP at the second position P2, P5, P8 calculated at step S11 by assuming that the intersecting road RD3, RD5 is not included in the host vehicle front image.

At step S14, the determination unit 3F determines whether the width W3, W6, W9 of the road pixels RP at the third position P3, P6, P9 calculated at step S12 is greater than the width W3E, W6E, W9E of the road pixels RP at the third position P3, P6, P9 estimated at step S13. When YES, it proceeds to step S15; when NO, it proceeds to step S16. At step S15, the determination unit 3F determines that the intersecting road RD3, RD5 exists at the third position P6, P9. At step S16, the determination unit 3F determines that the intersecting road does not exist at the third position P3.

If the width of the host vehicle travelling road RD1, RD2, RD4 is constant from the front to the back of the host vehicle travelling road RD1, RD2, RD4, the apparent width of the host vehicle travelling road RD1, RD2, RD4 on the host vehicle front image should be reduced as it goes toward the back in the host vehicle front image. On the other hand, when the intersecting road RD3, RD5 exists, the road width (the width W6, W9 of the road pixels RP) at the depth position (third position P6, P9) where the intersecting road RD3, RD5 exists is greater than the road width (the width W5, W8 of the road pixels RP) at the depth position (second position P5, P8) which is before the third position P6, P9 because a part of the intersecting road RD3, RD5 which extends to the left and right additionally appears in the host vehicle front image. Based on this point, the intersecting road detection device 15 of the first embodiment measures (calculates) the road width (the width W1 to W9 of the road pixels RP) on the host vehicle front image at each depth position (the first position P1, P4, P7, the second position P2, P5, P8, and the third position P3, P6, P9) in the direction from front to back on the host vehicle front image. The intersecting road detection device 15 of the first embodiment detects a portion (third position P6, P9) where the road width (the width W6, W9 of the road pixels RP) on the host vehicle front image is not smaller than the road width (the width W6E, W9E of the road pixels RP) which is expected (estimated) from the road width (the width W4, W5, W7, W8 of the road pixels RP) at the front depth position (first position P4, P7 and second position P5, P8) as a place (intersecting road RD3, RD5) where there is traffic intersecting the host vehicle travelling road RD2, RD4. In the intersecting road detection device 15 of the first embodiment, in order to detect the road pixels RP included in the host vehicle front image (in other words, to detect the attribute of the pixels), for example, the "label for each pixel" calculated (output) in the process (process in the image process device 3A) of the semantic segmentation in which the attribute is assigned to each of the plurality of pixels included in the image is utilized.

Second Embodiment

The host vehicle 1 to which the intersecting road detection device 15 of a second embodiment is applied is configured similarly to the host vehicle 1 to which the intersecting road detection device 15 of the first embodiment described above is applied, except that it will be described later.

Figure 6:
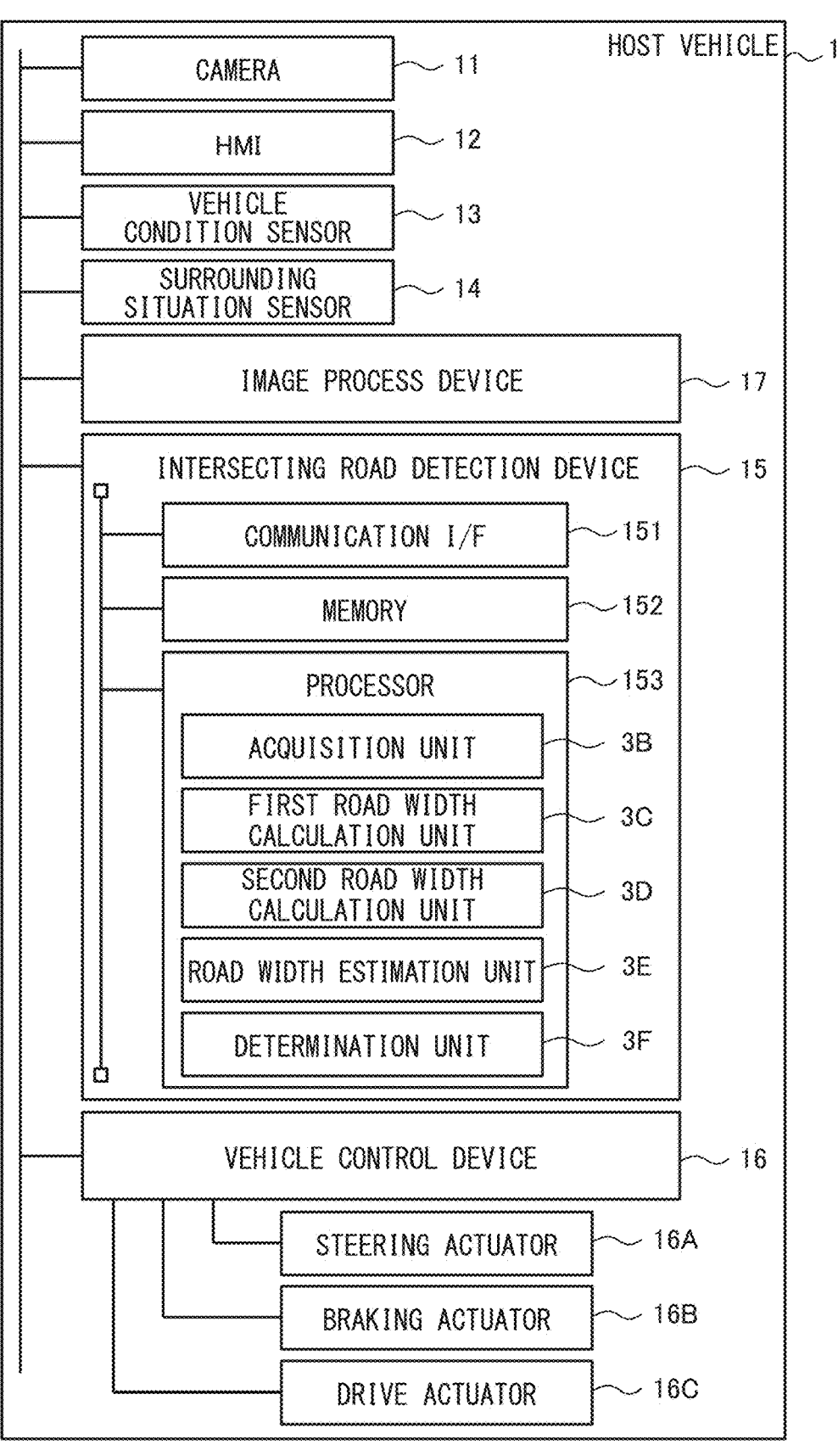
FIG. 6 is a view showing an example of the host vehicle 1 to which the intersecting road detection device 15 of a second embodiment is applied.

FIG. 6 is a view showing an example of the host vehicle 1 to which the intersecting road detection device 15 of the second embodiment is applied. In the example (example shown in FIG. 1) of the host vehicle 1 to which the intersecting road detection device 15 of the first embodiment is applied as described above, the processor 153 of the intersecting road detection device 15 has the function as the image process device 3A. On the other hand, in the example shown in FIG. 6, the processor 153 of the intersecting road detection device 15 does not have the function as the image process device 3A, and an image process device 17 having the same function as the image process device 3A is provided outside the intersecting road detection device 15. That is, in the example shown in FIG. 6, the host vehicle 1 is provided with the image process device 17 separately from the intersecting road detection device 15.

In the example shown in FIG. 6, the camera 11 transmits the data of the host vehicle front image to the vehicle control device 16 and the image process device 17. The image process device 17 acquires the data of the host vehicle front image transmitted from the camera 11. In addition, the image process device 17 executes the process of the image segmentation (identification of the subject included in the image) such as, for example, the semantic segmentation or the like for the host vehicle front image. The acquisition unit 3B acquires the information indicating the road pixels RP from the process result of the image segmentation executed by the image process device 17.

Third Embodiment

The host vehicle 1 to which the intersecting road detection device 15 of a third embodiment is applied is configured similarly to the host vehicle 1 to which the intersecting road detection device 15 of the first embodiment described above is applied, except that it will be described later.

In the example of the host vehicle 1 to which the intersecting road detection device 15 of the first embodiment is applied as described above (the example shown in FIG. 1), the vehicle control device 16 is configured by the driving assistance ECU. On the other hand, in the example of the host vehicle 1 to which the intersecting road detection device 15 of the third embodiment is applied, the vehicle control device 16 is configured by an autonomous driving ECU.

In the example of the host vehicle 1 to which the intersecting road detection device 15 of the first embodiment is applied as described above (the example shown in FIG. 1), when the determination unit 3F determines that the intersecting road RD3, RD5 exists in front of the traveling direction of the host vehicle 1 (at the third position P6, P9), the vehicle control device 16 (driving assistance ECU) causes the HMI 12 to output the alarm indicating that the intersecting road RD3, RD5 exists in front of the traveling direction of the host vehicle 1, for example, by displaying, audio, or the like, based on the detection result of the intersecting road detection device 15 (determination result of the determination unit 3F). On the other hand, in the example of the host vehicle 1 to which the intersecting road detection device 15 of the third embodiment is applied, when the determination unit 3F determines that the intersecting road RD3, RD5 exists in front of the traveling direction of the host vehicle 1 (at the third position P6, P9), the vehicle control device 16 (autonomous driving ECU) generates a traveling plan of the host vehicle 1 for avoiding the collisions between another vehicle, a pedestrian, or the like jumping out from the intersecting road RD3, RD5 to the host vehicle travelling road RD2, RD4 and the host vehicle 1, and controls the steering actuator 16A, the braking actuator 16B, and the drive actuator 16C based on the traveling plan.

Fourth Embodiment

The host vehicle 1 to which the intersecting road detection device 15 of a fourth embodiment is applied is configured similarly to the host vehicle 1 to which the intersecting road detection device 15 of the second embodiment described above is applied, except that it will be described later.

In the example of the host vehicle 1 to which the intersecting road detection device 15 of the second embodiment is applied as described above (the example shown in FIG. 6), the vehicle control device 16 is configured by the driving assistance ECU. On the other hand, in an example of the host vehicle 1 to which the intersecting road detection device 15 of the fourth embodiment is applied, the vehicle control device 16 is configured by the autonomous driving ECU. In the example of the host vehicle 1 to which the intersecting road detection device 15 of the fourth embodiment is applied, similar to the example of the host vehicle 1 to which the intersecting road detection device 15 of the third embodiment described above is applied, when the determination unit 3F determines that the intersecting road RD3, RD5 exists in front of the traveling direction of the host vehicle 1 (at the third position P6, P9), the vehicle control device 16 (autonomous driving ECU) generates the traveling plan of the host vehicle 1 for avoiding the collisions between another vehicle, a pedestrian, or the like jumping out from the intersecting road RD3, RD5 to the host vehicle travelling road RD2, RD4 and the host vehicle 1, and controls the steering actuator 16A, the braking actuator 16B, and the drive actuator 16C based on the traveling plan.

As described above, although the embodiments of the intersecting road detection device, the intersecting road detection method, and the non-transitory recording medium of the present disclosure have been described with reference to the drawings, the intersecting road detection device, the intersecting road detection method, and the non-transitory recording medium of the present disclosure are not limited to the above-described embodiments, and may be appropriately changed without departing from the scope of the present disclosure. The configuration of each example of the embodiment described above may be appropriately combined. In each example of the above-described embodiment, the process performed in the intersecting road detection device 15 has been described as a software process performed by executing a program, but the process performed in the intersecting road detection device 15 may be a process performed by hardware. Alternatively, the process performed by the intersecting road detection device 15 may be a combined process of both software and hardware. Further, the program (the program for realizing the function of the processor 153 of the intersecting road detection device 15) that is stored in the memory 152 of the intersecting road detection device 15 may be recorded in a computer-readable storage medium (a non-transitory recording medium) such as, for example, a semiconductor memory, a magnetic recording medium, an optical recording medium, or the like for providing, distribution or the like.

The invention claimed is:

1. An intersecting road detection device comprising a processor configured to:

acquire information indicating road pixels which are pixels corresponding to roads included in an image obtained by shooting the front of a host vehicle, the road pixels being generated from the image;

calculate at least the width of the road pixels at a first position in a traveling direction of the host vehicle and the width of the road pixels at a second position different from the first position in the traveling direction of the host vehicle as the width of a road on which the host vehicle is traveling based on the road pixels;

calculate the width of the road pixels at a third position different from the first position and the second position in the traveling direction of the host vehicle based on the road pixels;

estimate the width of the road pixels at the third position based on at least the width of the road pixels at the first position and the width of the road pixels at the second position by assuming that an intersecting road which is a road intersecting the road on which the host vehicle is travelling is not included in the image; and determine that the intersecting road exists at the third position when calculated width of the road pixels at the third position is greater than estimated width of the road pixels at the third position.

2. The intersecting road detection device according to claim 1, wherein the processor is configured to determine that the intersecting road does not exist at the third position when the calculated width of the road pixels at the third position is equal to the estimated width of the road pixels at the third position.

3. The intersecting road detection device according to claim 1, whereat the third position is further away from the host vehicle than the first position and the second position.

4. An intersecting road detection method comprising:

acquiring information indicating road pixels which are pixels corresponding to roads included in an image obtained by shooting the front of a host vehicle, the road pixels being generated from the image;

calculating at least the width of the road pixels at a first position in a traveling direction of the host vehicle and the width of the road pixels at a second position different from the first position in the traveling direction of the host vehicle as the width of a road on which the host vehicle is traveling based on the road pixels;

calculating the width of the road pixels at a third position different from the first position and the second position in the traveling direction of the host vehicle based on the road pixels;

estimating the width of the road pixels at the third position based on at least the width of the road pixels at the first position and the width of the road pixels at the second position by assuming that an intersecting road which is a road intersecting the road on which the host vehicle is travelling is not included in the image; and determining that the intersecting road exists at the third position when calculated width of the road pixels at the third position is greater than estimated width of the road pixels at the third position.

5. A non-transitory recording medium having recorded thereon a computer program for causing a processor to perform a process comprising:

acquiring information indicating road pixels which are pixels corresponding to roads included in an image obtained by shooting the front of a host vehicle, the road pixels being generated from the image;

calculating at least the width of the road pixels at a first position in a traveling direction of the host vehicle and the width of the road pixels at a second position different from the first position in the traveling direction of the host vehicle as the width of a road on which the host vehicle is traveling based on the road pixels;

calculating the width of the road pixels at a third position different from the first position and the second position in the traveling direction of the host vehicle based on the road pixels;

estimating the width of the road pixels at the third position based on at least the width of the road pixels at the first position and the width of the road pixels at the second position by assuming that an intersecting road which is a road intersecting the road on which the host vehicle is travelling is not included in the image; and determining that the intersecting road exists at the third position when calculated width of the road pixels at the third position is greater than estimated width of the road pixels at the third position.

* * * * *